P. GANZHORN.
ROTARY CUTTER.
APPLICATION FILED NOV. 6, 1911.
1,033,001.
Patented July 16, 1912.
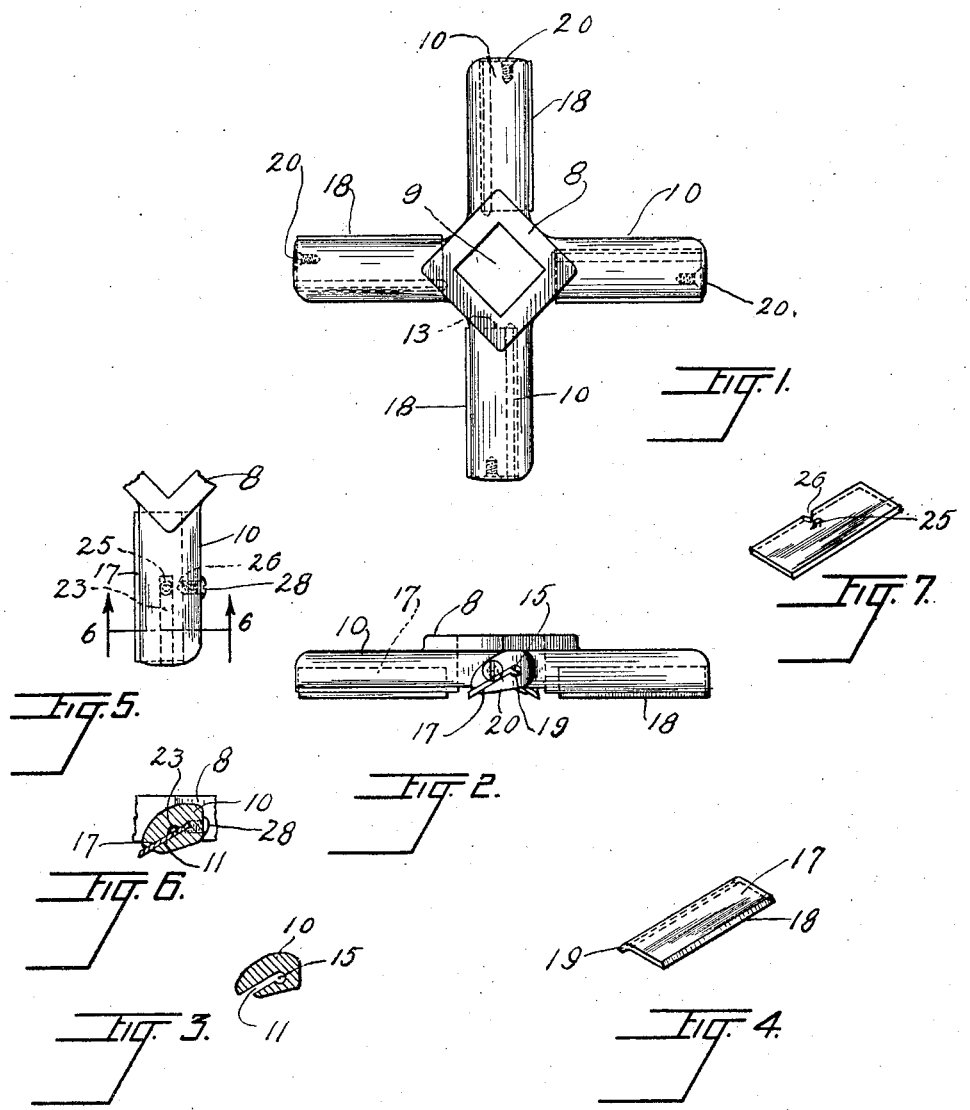
WITNESSES:
INVENTOR
Philip Ganzhorn
By
ATTORNEY

UNITED STATES PATENT OFFICE.

PHILIP GANZHORN, OF CHICAGO, ILLINOIS.

ROTARY CUTTER.

1,033,001. Specification of Letters Patent. Patented July 16, 1912.

Application filed November 6, 1911. Serial No. 658,789.

*To all whom it may concern:*

Be it known that I, PHILIP GANZHORN, a citizen of the United States, residing at Chicago, in the county of Cook and State of Illinois, have invented certain new and useful Improvements in Rotary Cutters, of which the following is a specification.

This invention relates to rotary cutters, particularly such as are used in machines for cutting meat, vegetables, and the like.

The object of the invention is to provide an improved cutter with blades which may be easily removed and replaced. The blades are of special construction and fit in slots in the arms of the cutter body, in such manner that they cannot become accidentally detached.

In the accompanying drawings—Figure 1 is a plan of the cutter. Fig. 2 is a side view. Fig. 3 is a section of any one of the radial arms in Fig. 1. Fig. 4 is a perspective view of one of the blades. Fig. 5 is a plan view of a portion of a modification. Fig. 6 is a section on the line 6—6 of Fig. 5. Fig. 7 is a perspective of a blade used in the modification.

In the drawings, 8 indicates the hub of the cutter body, with a squared opening 9 whereby it may fit on the end of a shaft or the like.

10 indicate arms of equal length radiating from the hub, and each of these arms has an inclined slot 11 extending lengthwise therein, the slot being open at the outer end of the arm and closed at the inner end as indicated at 13. The bottom or inner longitudinal edge of the slot terminates in a circular longitudinal groove or recess 15 the length of which is equal to the length of the slot, the upper side or wall 16 of the slot being at a tangent to the recess 15.

A blade 17 fits closely in each slot, and said blade has a cutting edge 18 at the front and a longitudinal bent or offset edge 19 at the back, which fits in the recess 15 when the blade is slipped in the slot, and this offset edge serves to retain the blade in the slot when it is inserted endwise in the arm. To prevent the blade from slipping out a screw 20 is inserted in the end of the arm, and the head of the screw laps the outer end of the blade. The same construction is provided in each of the arms. By the means described the blades are rigidly held in the slots, and cannot be removed except by removing the screws 20. But by removing said screws they can be slipped out easily to be sharpened or renewed.

In the modified form shown in Figs. 5, 6 and 7 the arms 10 have similar slots 11, but instead of the recesses 15 at the bottom of the slots, the upper walls of the slots having longitudinal grooves 23, in each of which fits a raised point or lug 25 formed on the top of the blade by a punch or similar instrument, and the blade also has a notch 26 at the back edge, to receive the points of a screw 28 which is inserted through the back of the arms. When the blades are in place the lugs 25 engaging in the grooves 23 prevent the blades slipping out forwardly, but they may be slipped out endwise by loosening the screws 28.

In either of the forms described convenient removal of the blades for sharpening or other purposes is possible, and the cutter is superior in this respect to cutters in which the cutting edges are integral with the body, and consequently the whole cutter has to be renewed when it becomes dull, and also superior to those cutters in which the blades are riveted in place. Inasmuch as the blades are held in slots with walls on opposite sides thereof, they are rigidly supported, with little danger of dropping out into the material should they become broken or loose.

I claim:

1. A rotary cutter comprising a body having inclined radial slots and longitudinal grooves adjacent to said slots, and blades fitting in the slots and having projections engaging in said grooves, to hold the blades in place.

2. A rotary cutter comprising a body having outwardly extending longitudinally slotted arms and grooves communicating with the slots, and blades fitting in the slots, between opposite walls thereof, and having projections engaging in said grooves.

3. A rotary cutter comprising a body having inclined slots open at the front and one end, and grooves extending lengthwise along the slots, and blades in the slots, and removable through the open ends thereof, the blades having projections engaging in the grooves.

4. A rotary cutter comprising a body having radial arms with an inclined longitudinal slot in each arm and a longitudinal groove at the inner edge of the slot, said slot and groove being open at the outer end of the arm, and a blade fitting in each slot
5 and having an offset part at the rear edge thereof, fitting in the groove, and a screw in the arm, engaging the blade.

In testimony whereof, I affix my signature in presence of two witnesses.

PHILIP GANZHORN.

Witnesses:
D. D. DUEM,
C. M. THOM.

Copies of this patent may be obtained for five cents each, by addressing the "Commissioner of Patents, Washington, D. C."